(12) United States Patent  
Sawaguchi

(10) Patent No.: US 7,040,030 B2
(45) Date of Patent: May 9, 2006

(54) LASER CENTERING DEVICE

(75) Inventor: Sigeyuki Sawaguchi, Kanagawa (JP)

(73) Assignee: Sokkia Co., Ltd., Atsugi (JP)

( * ) Notice: Subject to any disclaimer, the term of this patent is extended or adjusted under 35 U.S.C. 154(b) by 0 days.

(21) Appl. No.: 10/348,333

(22) Filed: Jan. 22, 2003

(65) Prior Publication Data
US 2003/0177652 A1 Sep. 25, 2003

(30) Foreign Application Priority Data
Feb. 8, 2002 (JP) ............... 2002-032897

(51) Int. Cl.
G01C 1/00 (2006.01)
G01C 15/00 (2006.01)

(52) U.S. Cl. .............. 33/290; 33/281; 33/286; 33/DIG. 21

(58) Field of Classification Search ......... 33/290–292, 33/DIG. 21, 286, 281–283, 451, 227, 285
See application file for complete search history.

(56) References Cited

U.S. PATENT DOCUMENTS

| 3,771,876 | A | * | 11/1973 | Ljungdahl et al. ............ 33/291 |
| 3,959,888 | A | * | 6/1976 | Baker et al. .................. 33/282 |
| 4,202,110 | A | * | 5/1980 | Kooi ........................ 33/299 |
| 4,458,425 | A | * | 7/1984 | Hester ...................... 33/296 |
| 4,781,457 | A | * | 11/1988 | Hirano et al. ............... 356/250 |
| 4,899,452 | A | * | 2/1990 | Schafer ..................... 33/296 |
| 5,218,770 | A | * | 6/1993 | Toga .................... 33/DIG. 21 |
| 5,610,711 | A | * | 3/1997 | Rando ....................... 33/290 |
| 5,836,081 | A | * | 11/1998 | Orosz, Jr. ................... 33/290 |
| 5,907,907 | A | * | 6/1999 | Ohtomo et al. .............. 33/291 |
| 5,946,133 | A | * | 8/1999 | Aikawa ..................... 359/383 |
| 6,012,229 | A | * | 1/2000 | Shiao ....................... 33/365 |
| 6,076,266 | A | * | 6/2000 | Beckingham et al. ......... 33/292 |
| 6,124,935 | A | * | 9/2000 | Matthews ................... 33/286 |
| 6,195,902 | B1 | * | 3/2001 | Jan et al. .................... 33/286 |
| 6,314,651 | B1 | * | 11/2001 | Ohtomo et al. .............. 33/290 |
| 6,453,569 | B1 | * | 9/2002 | Kumagai et al. ............. 33/281 |
| 6,606,798 | B1 | * | 8/2003 | El-Katcha et al. ........... 33/290 |
| 6,688,009 | B1 | * | 2/2004 | Haijima et al. .............. 33/281 |
| 6,724,471 | B1 | * | 4/2004 | Feist et al. .................. 33/290 |
| 6,796,038 | B1 | * | 9/2004 | Humphries ................. 33/265 |
| 6,802,817 | B1 | * | 10/2004 | Baxter-Jones et al. ....... 33/512 |
| 6,823,600 | B1 | * | 11/2004 | Vaughan .................... 33/288 |
| 2002/0062570 | A1 | * | 5/2002 | Palumbo et al. ............. 33/286 |

FOREIGN PATENT DOCUMENTS

JP 6-213664 A 8/1994

* cited by examiner

Primary Examiner—Yaritza Guadalupe
(74) Attorney, Agent, or Firm—Nixon Peabody LLP

(57) ABSTRACT

A laser centering device (30) that is attached to a survey apparatus by replacing it with a centering telescope optical system is formed of an inner barrel (32) that fixes a pentagonal prism (40) at one end thereof and is internally provided with a laser beam source (42), an intermediate barrel (34) that moves the inner barrel in the axial direction and fixes it so as to adjust the position thereof, and an outer barrel (36) that turns the intermediate barrel around the axis and fixes it so as to adjust the angle thereof, and at the same time, is fixed at the portion (38) for fixing the centering telescope optical system of the survey apparatus (1). The invention provides a laser centering device for which the emission direction of a laser beam is simply adjusted.

10 Claims, 6 Drawing Sheets

LASER CENTERING DEVICE

TECHNICAL FIELD OF THE INVENTION

The present invention relates to a laser centering device that is replaceable in a survey apparatus having a centering telescope optical system.

BACKGROUND OF THE INVENTION

A prior art survey apparatus has been generally provided with a centering telescope optical system (centering telescope), and has utilized a centering telescope optical system when deploying a survey apparatus directly above a point of measurement. The centering telescope optical system is able to carry out an accurate centering operation because an operator looks directly into the centering telescope optical system. However, since the centering telescope optical system is located at a lower position than that of a collimation telescope used for measurement, the operator looks into the optical system in a half-sitting posture (in a squatted state), which creates a burden on the operator. In particular, work for installing a survey apparatus on an inclined site becomes a large burden on an operator.

Therefore, recently, survey apparatuses such as a survey apparatus provided with a laser centering device, by which a visible laser beam is emitted directly therebelow, and a survey apparatus having a centering telescope optical system and a laser centering device are made available in addition to the centering telescope optical system.

A survey apparatus having such an optical centering system and a laser centering device is disclosed in Japanese Unexamined Patent Publication No. Hei-6-213664. The survey apparatus is shown in FIG. 6. The survey apparatus 1 is provided with a laser centering device formed of a centering telescope optical system 5, a laser beam source 3, a collimate optical system 4, a mask member 41, and a transparent member 6.

In order to use a laser centering device, a laser beam is emitted from the laser beam source 3, and the laser beam is collimated to be a parallel beam by the collimate optical system 4. Next, light beams other than the laser beam, which are made incident into a reflection portion 61 of the transparent member 6, are cut off by the mask member 41. Then, the laser beam is reflected directly below by the reflection portion 61, and irradiates a stake 10 showing a point of measurement. And, an operator adjusts the position of a survey apparatus body 2 so that the point irradiated by the laser beam, that is, the laser spot becomes coincident with the point of measurement on the stake 10. Thus, it is remarkably easy to carry out centering operations since it is sufficient that for the laser centering device the operator only look at the vicinity directly below the survey apparatus 1.

However, for work in bright sunlight, the laser centering device is inconvenient in that it is difficult to see the laser spot. During such times, a centering telescope optical system 5 is used. At this time, when an operator looks into an eyepiece portion 51 of the centering telescope optical system 5, the point of measurement on the stake 10 can be seen through a prism 7 and the transparent member 6. Therefore, the position of the survey apparatus body 2 is adjusted so that the cross line of the centering telescope optical system is made coincident with the point of measurement on the stake 10.

In the survey apparatus shown in FIG. 6, usually, it is possible to easily carry out survey work using the laser centering device. When it is difficult to see the laser spot in bright sunlight work, the centering telescope optical system 5 can be used, and this is convenient.

However, a survey apparatus in which a centering telescope optical system is detachably mounted is widely used at present. FIG. 7 shows an example of a structure of attaching such a centering telescope optical system to a survey apparatus. The centering telescope optical system 20 is formed of an outer barrel 136 in which a Dachprisma 22 and an object lens 24 are fixed at one end thereof, and an inner barrel 132 that is slidable in the outer barrel 136, and is provided with a focusing plate 26 and a diopter-adjustable eyepiece lens 28 in the inner barrel 132. The outer barrel 136 of the centering telescope optical system 20 is fixed at the fixing portion 38 of the centering telescope optical system by being pressed by the tip end of a screw screwed in the fixing portion 38 of the centering telescope optical system in the survey apparatus 1. The centering telescope optical system 20 can be easily detached from the survey apparatus 1 by the unit of the outer barrel 136 if a side plate 11 is removed from the survey apparatus 1 and the screw 62 is loosened.

Although a survey apparatus provided with both a centering telescope optical system and a laser centering device as shown in FIG. 6 is desirable, there is a problem in that the apparatus becomes complicated and becomes expensive. Therefore, since a survey apparatus provided with a detachable centering telescope optical system has been widely used, it is considered, in order to facilitate centering operations, that in such a survey apparatus, the centering telescope optical system and laser centering device are replaced.

However, if, in a laser centering device as shown in FIG. 6, there is an error in the attaching position and angle of the laser beam source 3 and reflection portion 61, a centering error occurs. In particular, even if an error in the angle of the reflection portion 61 is only slight, the position of the laser spot largely changes due to a principle of the optical lever, wherein there is a problem in that a large centering error occurs. However, adjustment of the emission direction of the laser beam requires various steps of adjustment for each of the many components such as the laser beam source 3, reflection portion 61, etc., and it is very cumbersome.

Therefore, in order to solve the above-described problems, it is an object of the present invention to provide a laser centering device for which the emission direction of a laser beam can be simply adjusted.

SUMMARY OF THE INVENTION

In order to solve the above-described problems, the laser centering device according to the invention includes a prism fixed at one end thereof and is internally provided with a laser beam source, wherein the laser centering device is mounted to a survey apparatus in which positional adjustment in the axial direction and angular adjustment around the axis are enabled.

The laser centering device may also include an inner barrel having a prism fixed at one end thereof and a laser beam source provided therein; an intermediate barrel for fixing the inner barrel so that it is adjustably positioned in the axial direction; and an outer barrel for fixing the intermediate barrel so that its angle around the axis is made adjustable, which is mounted on a survey apparatus.

The laser centering device according to the invention may also have a pentagonal prism.

The laser centering device may also have a slot extending in the axial direction at a part protruding from the outer barrel in the intermediate barrel; a screw inserted into the slot is screwed in the inner barrel, a slot extending in the circumferential direction is provided at a part protruding from the survey apparatus in the outer barrel; and a screw inserted into the corresponding slot is screwed in the intermediate barrel.

The laser centering device may also have graduations on the sides of the respective slots.

The laser centering device may also have a rubber cover attached to a part protruding from a survey apparatus of the laser centering device.

The invention also encompasses a method for adjusting a laser beam emission direction in a survey apparatus to which a laser centering device as previously described is attached. In this method, an adjustment is made to the emission direction of a laser beam in a survey apparatus provided with a laser centering device. A mat having the same color as that of a laser beam emitted from the laser centering device is provided, on which a concentric circle is depicted is placed directly below the perpendicular axis of the survey apparatus so as to cause the center of the mat to align with the perpendicular axis, wherein the emission direction of the laser beam is adjusted so that the laser beam is irradiated onto the center of the mat.

The mat for adjusting a laser centering device has the same color as that of a laser beam emitted from the laser centering device and has a concentric circle depicted thereon.

DETAILED DESCRIPTION OF THE PREFERRED EMBODIMENTS OF THE INVENTION

Figure 1:
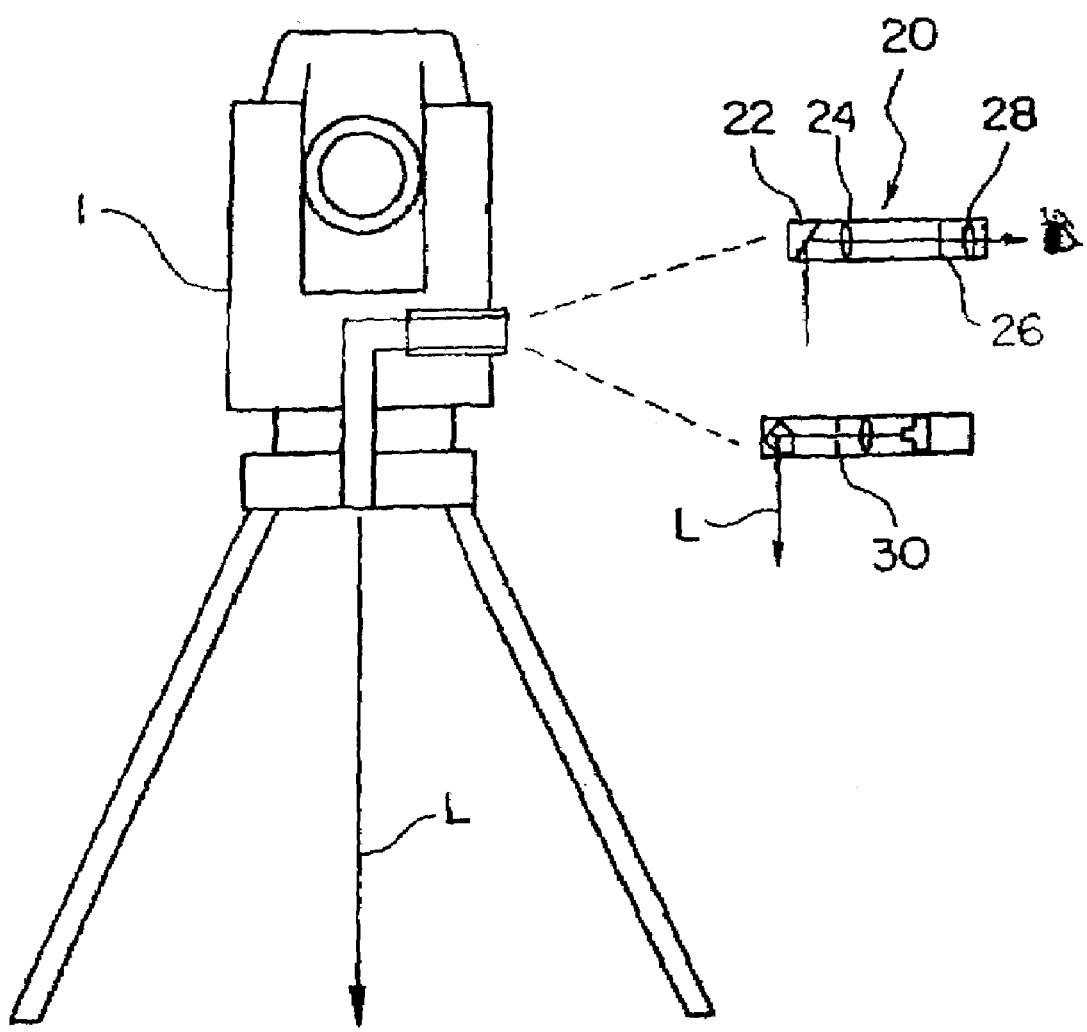
FIG. 1 is a view describing the outline of a survey apparatus that is provided with a laser centering device according to the invention.

As shown in FIG. 1, the invention relates to a laser centering device 30, which can be mounted in a survey apparatus 1 equipped with a detachable centering telescope optical system 20 after being replaced for the centering telescope optical system. Since the centering telescope optical system 20 is provided with a Dachprisma 22, an objective lens 24, a focusing plate 26, and an eyepiece lens 28 as in a prior art optical system, a detailed description thereof is omitted.

Figure 2:
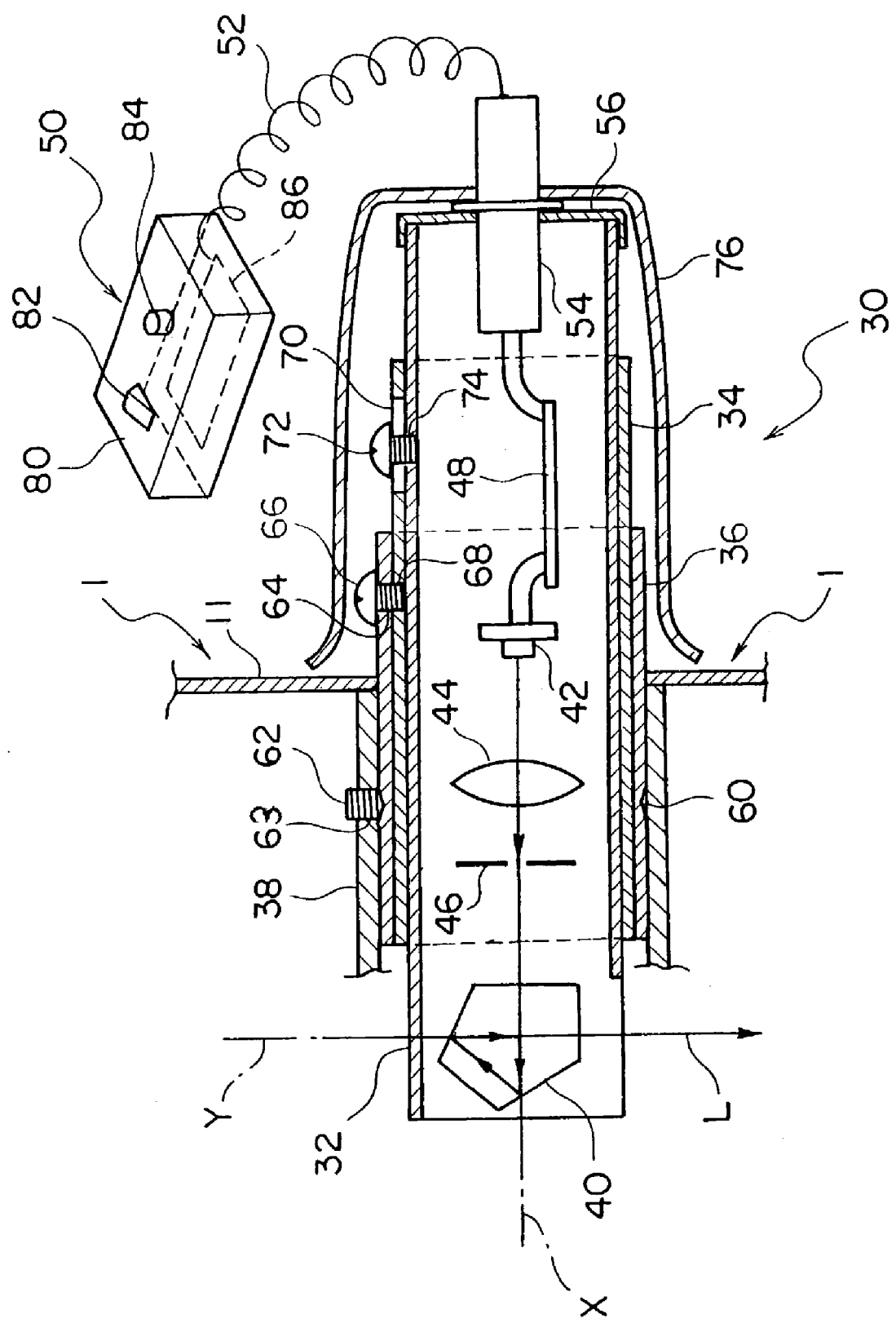
FIG. 2 is a sectional view of a laser centering device according to the first embodiment of the invention.
Figure 3:
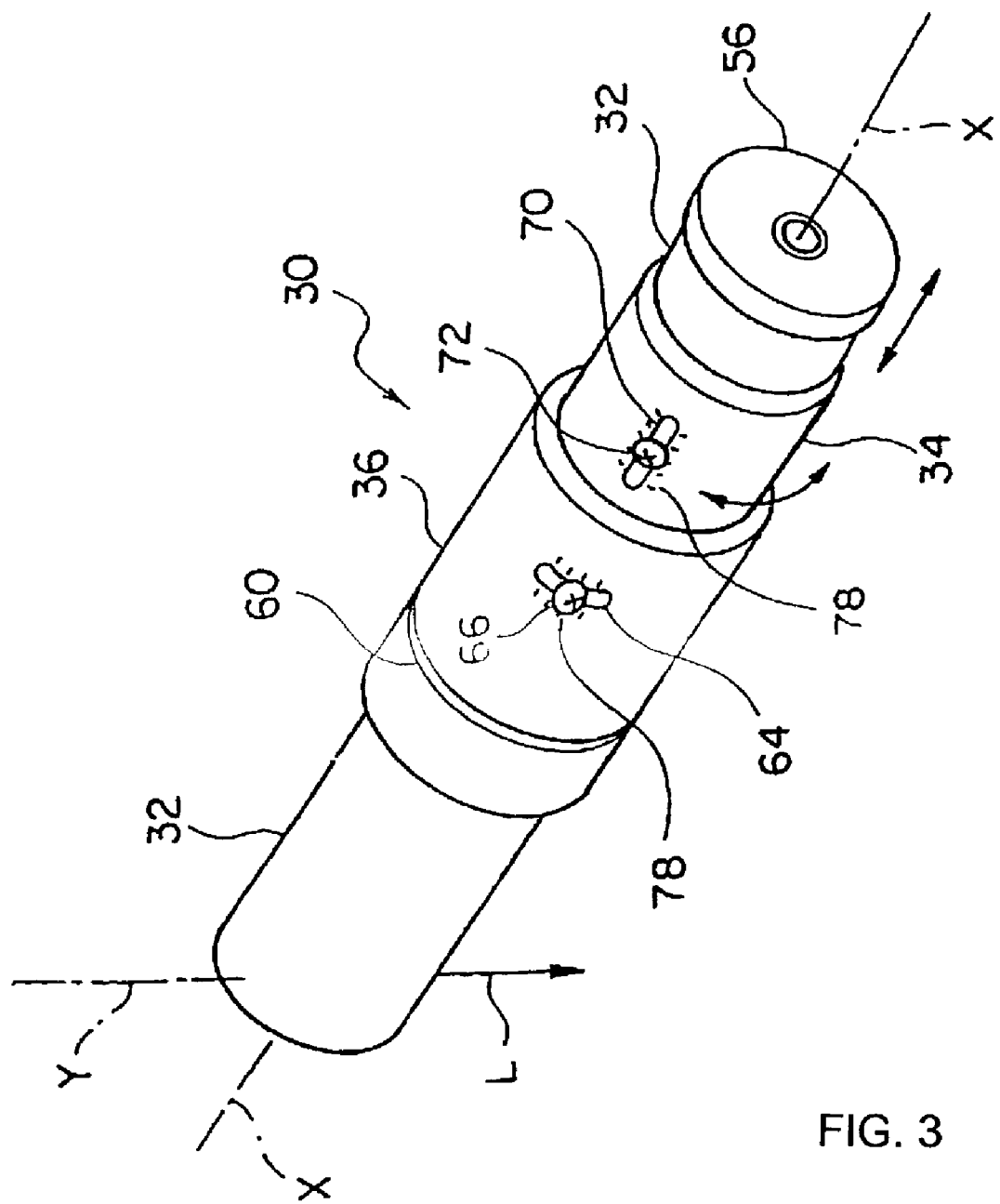
FIG. 3 is a perspective view showing the laser centering device according to the first embodiment.

Therefore, a detailed description is given of a laser centering device 30 according to a first embodiment of the invention with reference to a sectional view shown in FIG. 2 and a perspective view shown in FIG. 3. The laser centering device 30 includes an inner barrel 32, an intermediate barrel 34 having the inner barrel 32 fixed so as to adjust the position thereof in the axial direction, and an outer barrel 36 having the intermediate barrel 34 fixed so as to adjust the angle thereof around the axis X, wherein the outer barrel 36 is fixed at the fixing portion 38 (lower body cover) of the centering telescope optical system of the survey apparatus 1.

A laser diode 42 which is a visible laser beam source for emitting a laser beam L, a collimation lens 44 that collimates the laser beam emitted from the laser diode 42, an aperture 46 for stopping down the laser beam L, and a printed circuit board 48 for controlling the light emission of the laser diode 42 are fixed in the vicinity of the center of the inner barrel 32. A pentagonal prism 40 is fixed at one end of the inner barrel 32, which reflects the laser beam directly therebelow, and a cover 56 on which a connector 54 for connection through a external power source 50 and a cable is detachably mounted at the other end of the inner barrel 32.

A V-shaped sectional groove is provided on the outer barrel 36. The sharp end of a screw 62 is pressed to the V-shaped sectional groove 60 by screwing the screw 62 in a screw hole 63 secured at the fixing portion of the optical centering device and tightening the same, wherein the fixing portion 38 of the centering telescope optical system and the outer barrel 36 are firmly fixed so that mutual movement thereof is not permitted. Also, a slot 64 extending in the circumferential direction is provided at a portion protruding from the survey apparatus 1 in the outer barrel 36. By screwing the tip end of a screw 66, which is inserted into the slot 64, in a screw hole 68 secured at the intermediate barrel 34 and tightening the same, the outer barrel 36 and intermediate barrel 34 are firmly fixed so that mutual movement thereof is not permitted. Further, if the screw 66 is loosened, angular adjustment of the intermediate barrel 36 around the axis X is enabled by turning the intermediate barrel 36 around the axis X.

A slot 70 extending in the axial direction is provided at a portion protruding from the outer barrel 36 in the intermediate barrel 34. By screwing the tip end of a screw 72, which is inserted into the slot 70, in a screw hole 74 secured at the inner barrel 32 and tightening the same, the intermediate barrel 34 and inner barrel 32 are firmly fixed so that mutual movement thereof is not permitted. Further, if the screw 72 is loosened, the inner barrel 32 is moved in the direction of the axis X, wherein the position of the inner barrel 32 is adjustable in the axis X. And, graduations 78 are attached to the sides of both slots 64 and 70, for which it is possible to visibly check the amount of adjustment of each of the inner barrel 32 and intermediate barrel 34, and adjustment work of the laser beam L in the emission direction can be facilitated.

In FIG. 2 and FIG. 3, both the slots 64 and 70 are aligned with each other and arranged in the circumferential direction. However, the circumferential position of both the slots 64 and 70 may shift. Also, in the slots 64 and 70 at the side close to the survey apparatus 1, it is easier for the screws 66 and 72 to be turned at the side of the laser centering device 30 than at the upper side thereof. In particular, it is favorable that the slot 64 approached to the survey apparatus 1 is arranged sideways.

A rubber cover 76 is placed at a portion protruding from the survey apparatus 1 of the laser centering device 30 for dust-proof, waterproof, and impact-resisting protection, and appearance of the laser centering device 30. A hole is prepared by drilling the rubber cover 76 at a position corresponding to the connector 54.

A external power source 50 accommodates a battery in its casing 80, and, at the same time, is provided with a power switch 82 outside the casing 80, a knob 84 for adjusting the light amount of the laser beam L, and Magic Tape (Trademark) 86 to attach the power source 50 to the outside of the survey apparatus 1. Another piece of Magic Tape (Trademark) (not illustrated) is provided at a position where the external power source 50 does not constitute any hindrance, in order to fix the external power source 50. Also, a cable 52 to connect the external power source 50 to a connector 54 is a curled cable, and it is usually shortened as much as possible, whereby it does not constitute any hindrance.

Herein, a description is given of a method for adjusting the emission direction of the laser beam L when attaching the laser centering device 30 to a survey apparatus 1. When attaching the laser centering device 30 to the survey apparatus 1, first, a side plate 11 is removed from the survey apparatus 1. Then, the centering telescope optical system 20 is detached, and the outer barrel 36 is fixed at the fixing portion 38 of the centering telescope system with a screw 62. Next, the intermediate barrel 34 is inserted into the outer barrel 36 and is provisionally set with a screw 66. Next, the inner barrel 32 is inserted into the intermediate barrel 34 and is provisionally set with a screw 72.

Herein, the survey apparatus 1 is made horizontal, and a reference point is correctly placed directly below the perpendicular axis Y (machine center). The power switch 82 of the laser centering device 30 is turned on to cause a laser beam L to be emitted to the reference point of the laser beam L. Here, a shift between the reference point and a point to which the laser beam L is emitted is detected. Then, with respect to a shift of the laser centering device 30 in the direction of axis X, the screw 72 is loosened and the inner barrel 32 is moved forward and backward in the direction of the axis X, and with respect to a shift in the direction orthogonal thereto, the screw 66 is loosened and the intermediate barrel 34 is turned around the axis X, wherein, after the laser beam L is adjusted so that it can be correctly irradiated onto the reference point, both screws 66 and 72 are provisionally tightened.

Thereafter, the survey apparatus 1 is turned around the perpendicular axis Y. After it is checked that the laser beam L can be accurately irradiated onto the reference point in any direction, both screws 66 and 72 are regularly tightened. Adjustment of the laser beam L in the emission direction is terminated.

Figure 4:
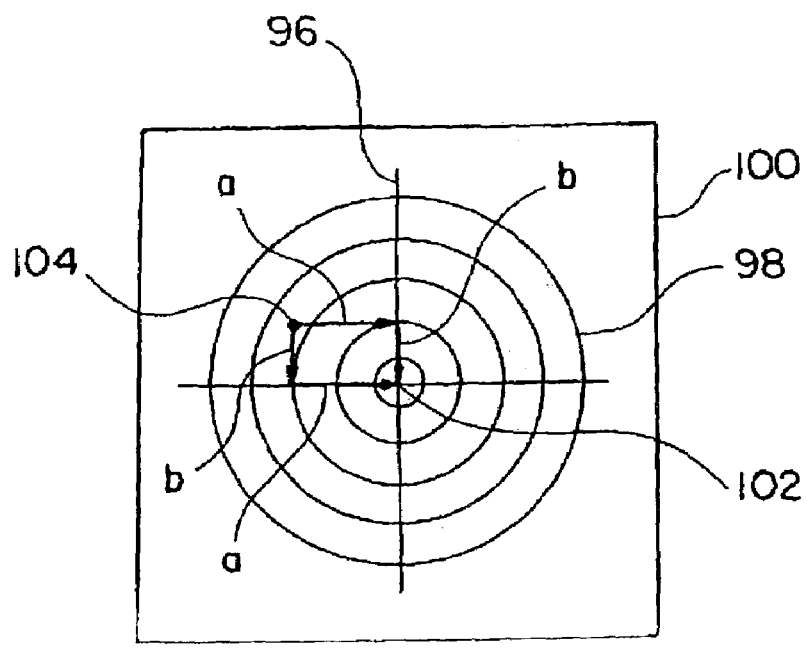
FIG. 4 is a view showing a mat used for adjustment of the emission direction of the laser beam in the laser centering device according to the invention.

When adjusting the emission direction of the laser beam L in such a laser centering device 30, a mat 100 having the same color as that of the laser beam L, on which a cross line 96 and concentric circles 98 as shown in FIG. 4 are depicted, is placed so that the center 102 thereof is made coincident directly below the perpendicular axis Y of the survey apparatus 1, and the laser beam L is irradiated onto the mat 100. By adjusting the position of the inner barrel 32 in the direction of the axis X and angle of the intermediate barrel 34 around the axis X, a laser spot 104, which is the point of irradiation of the laser beam L, is moved from a to b or b to a as shown by the arrows, thereby being made coincident with the center 102 of the mat 100, wherein the emission direction of the laser beam L is adjusted. Using the mat 100, it becomes easy to look into the laser spot 104, and it is easy to estimate the amount of adjustment, wherein it becomes easy to carry out attaching and adjusting work of the laser centering device 30. Herein, if a prescribed relationship is established with respect to the interval of the concentric circles 98 and interval of graduations 78 attached to the sides of the slots 64 and 70, it becomes easier still to adjust the emission direction of the laser beam L.

As a matter of course, adjustment of the emission direction of the above-described laser beam L can be carried out at any time not only when attaching a laser centering device 30 to a survey apparatus 1 but also when any centering error occurs in the survey apparatus after the laser centering device 30 is attached.

The present embodiment can bring about the following effects.

(1) Even if there is an error in the setting position and angle of the laser diode 42, collimation lens 44, aperture 46 and pentagonal prism 40, etc., and the emission direction of a laser beam L emitted from the laser centering device 30 shifts from the Y direction of the perpendicular axis of a survey apparatus 1, the emission direction of the laser beam L is adjusted by adjusting the position of the inner barrel 32 in the direction of axis X and the angle of the intermediate barrel 34 around the axis X, and the shift can be simply removed, wherein almost no centering error can be generated.

(2) By changing the size and profile of the intermediate barrel 34 and outer barrel 36, the laser centering device 30 can be simply attached to a different type of survey apparatus.

(3) Since the pentagonal prism 40 can vary the orientation of the laser beam L by a right angle (90°) at all times, the emission direction of the laser beam L does not vary due to a specified difference in the setting angle of the pentagonal prism 40 around the axis perpendicular to the paper (page) of FIG. 2. Therefore, a shift of the laser beam L in the direction of the axis X of the laser centering device 30 is slight, and it is easy to remove the difference by only slight adjustment in the position of the inner barrel 32 in the direction of the axis X. On the contrary, if a prism other than a pentagonal prism is used, the emission direction of the laser beam L may largely shift even by a slight difference in the setting angle of the prism, wherein it becomes necessary to considerably move the inner barrel 32 in order to eliminate the shift. As a matter of course, if there is any difference in the setting angle of the pentagonal prism 40 around the axis parallel to the paper (page) of FIG. 2, the emission direction of the laser beam L largely shifts in the direction orthogonal to the axis X of the laser centering device. However, the shift can be simply removed by adjusting the intermediate barrel 34 around the axis X.

(4) Since the screws 66 and 72 that enable adjustment of mutual positions and angles of the inner barrel 32, intermediate barrel 34 and outer barrel 36 are provided outside the survey apparatus 1, the emission direction of the laser beam L can be simply adjusted by a user himself at all times without disassembling the survey apparatus 1, that is, requesting adjustment by servicing personnel.

(5) Since graduations 78 are attached to the sides of slots 70 and 64, which are respectively provided at the intermediate barrel 34 and outer barrel 36, it is possible to look into the respective amounts of adjustment of the inner barrel 32 and intermediate barrel 34, wherein it becomes easier still to adjust the emission direction of the laser beam L.

(6) Since the rubber cover 76 is provided on a portion protruding from the survey apparatus 1 of the laser centering device 30, the laser centering device 30 can be protected from dust, water and impacts, and an excellent appearance can be secured.

(7) A centering telescope optical system 20 can be replaced for the laser centering device 30, as necessary, with respect to a prior art survey apparatus 1 equipped with the centering telescope optical system 20, wherein this is convenient and economical.

(8) Since an external power source 50 is used in the embodiment, it is inexpensive in spite of being large in size, and a battery having a sufficient capacity and voltage can be used, wherein it is possible to emit a laser beam of a sufficient amount of light for a longer period of time. In addition, since the power switch 82 and knob 84 for adjusting the light amount are provided with the external power source 50, the external power source 50 can be held at a position where it is easy for an operator to handle and operate it. Therefore, satisfactory operation efficiency can be secured.

Figure 5:
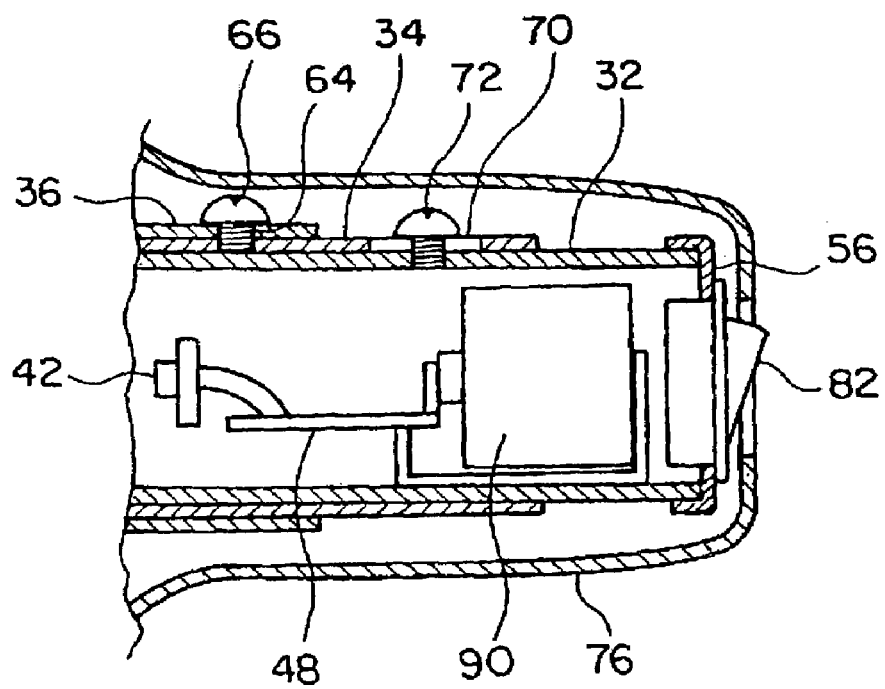
FIG. 5 is a partially sectional view of a laser centering device according to the second embodiment of the invention.
Figure 6:
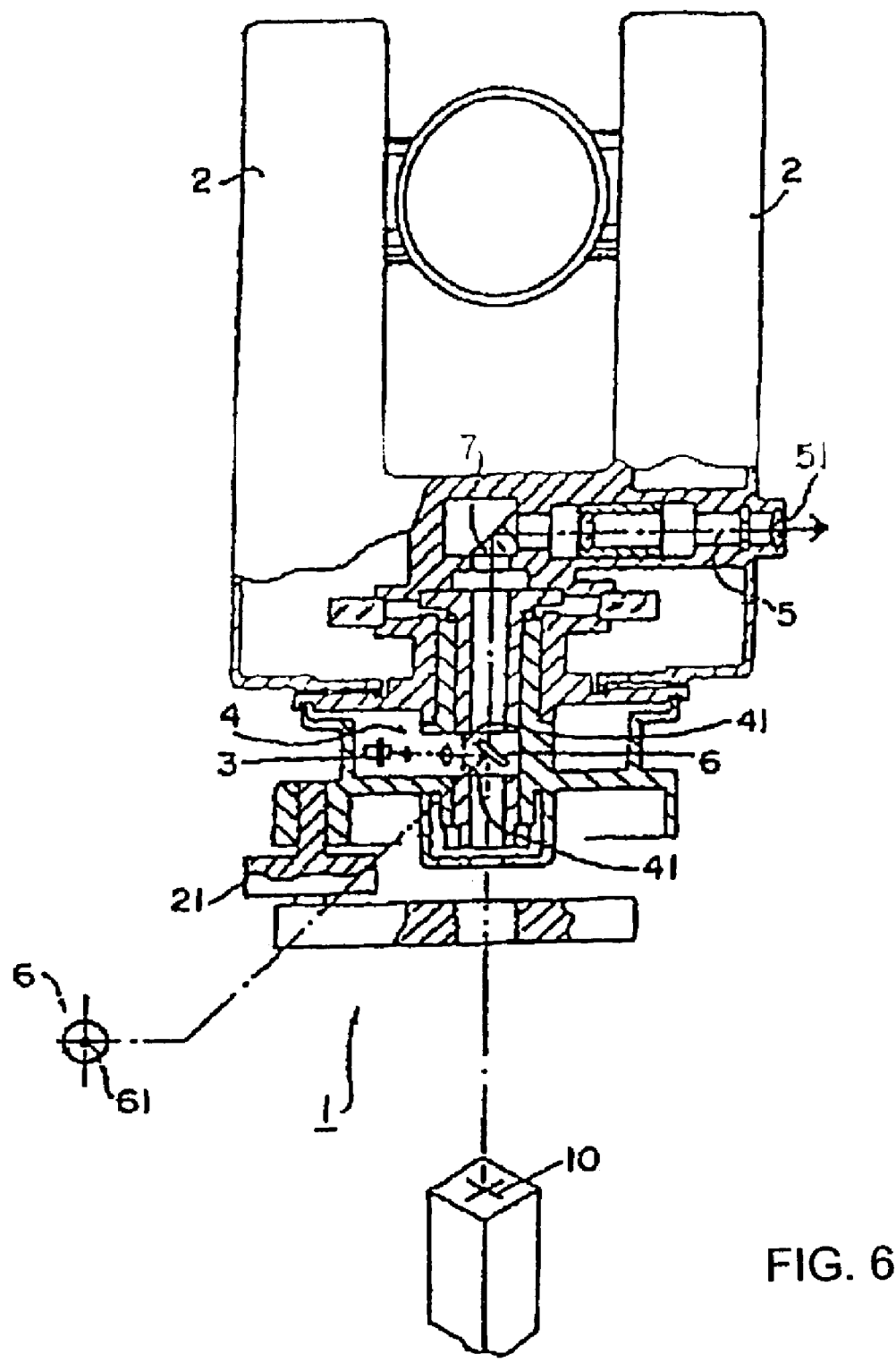
FIG. 6 is a view showing a survey apparatus that is concurrently provided with a prior art centering telescope optical system and laser centering device.
Figure 7:
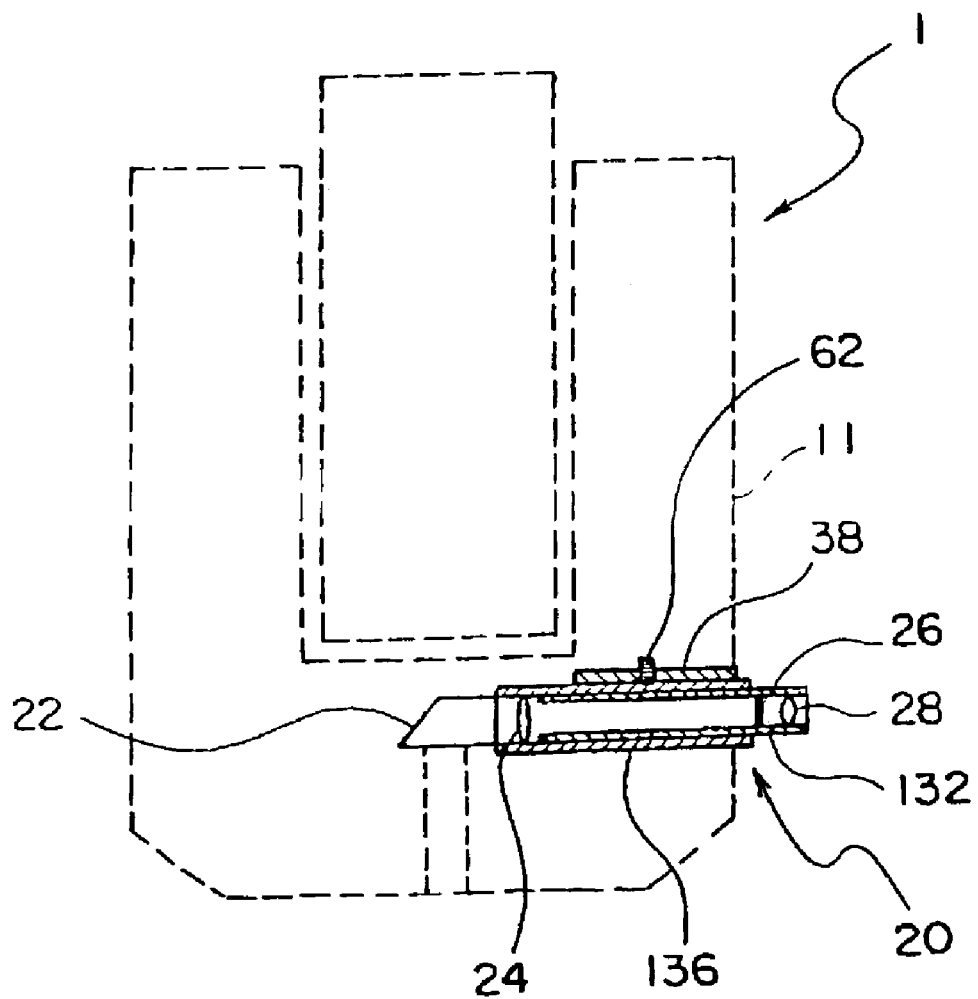
FIG. 7 is a view showing a survey apparatus in which a prior art centering telescope optical system can be mounted.

Next, a description is given of a second embodiment of a laser centering device 30 according to the invention with reference to a sectional view shown in FIG. 5. The laser centering device 30 according to the embodiment is roughly the same as that of the above-described first embodiment, excepting that a battery 90 is accommodated in the inner barrel 32. For this reason, the power switch 82 and knob (not illustrated) for adjusting the light amount are fixed on the cover 56 instead of the connector 54 to connect a cable 52. Holes are drilled at positions corresponding the power switch 82 and the knob for adjusting the light amount on the rubber cover 76 instead of a hole secured at the position of the connector 54. All other embodiment descriptions are the same as those of the first embodiment. With the present second embodiment, since no external power source is required, appearance of the survey apparatus 1 is made further neat, and a further satisfactory appearance can be secured in addition to the effects (1) through (7) which are brought about by the first embodiment.

However, the present invention is not limited to the above-described embodiments, but may be subjected to various modifications. For example, (1) the laser centering device 30 may be formed of only the inner barrel 32, and the inner barrel 32 may be simply fixed at the portion 28 for simply fixing the fixing portion 28 of the centering device telescope optical system so that both positional adjustment in the direction of the axis X and angular adjustment around the axis X are enabled. (2) a Dachprisma 22 that is common to the centering telescope optical system 20 may be used instead of the pentagonal prism 40. (3) the slot 64 extending in the circumferential direction is provided in the outer barrel 36, and the slot 70 extending in the direction of the axis X is provided in the intermediate barrel 34. However, on the contrary, a slot extending in the direction of the axis X may be provided in the outer barrel 36, and a slot extending in the circumferential direction may be provided in the intermediate barrel 34. (4) the second embodiment may be modified so that the rubber cover 76 is made slightly soft, and the power switch 82 and the knob for adjusting the light amount are operated on the rubber cover 76 without providing, on the rubber cover, any hole at the positions corresponding to the power switch 82 and knob for adjusting the light amount.

As described above, since a laser centering device that has a prism fixed at one end thereof and a laser beam source provided therein is mounted to a survey apparatus in which positional adjustment in the axial direction and angular adjustment around the axis are enabled, it is possible to simply adjust the emission direction of a laser beam by adjusting the position of the laser centering device in the axial direction and angle thereof around the axis. Therefore, a shift of the laser beam emitted from the laser centering device from the perpendicular direction of a survey apparatus can be simply eliminated so as not to generate any centering error.

The laser centering device includes an inner barrel having a prism fixed at one end thereof and a laser beam source provided therein; an intermediate barrel for fixing the inner barrel so that it is adjustably positioned in the axial direction; and an outer barrel for fixing the intermediate barrel so that its angle around the axis is made adjustable, which is mounted on a survey apparatus. Therefore, it is possible to simply mount a laser centering device to any different type of survey apparatus by changing the size and profile of the intermediate barrel and outer barrel.

Since the laser centering device includes a pentagonal prism that is capable of maintaining the incident light and reflection light at a right angle at all times, a difference in the setting angle of the pentagonal prism does not largely shift the emission direction of the laser beam toward the axial direction of the laser centering device, and a shift in the emission direction of the laser beam toward this direction can be simply eliminated by only slight positional adjustment of the inner barrel in the axial direction, and it becomes easier still to adjust the emission direction of the laser beam.

A slot extending in the axial direction at a part protruding from the outer barrel in the intermediate barrel is provided; a screw inserted into the slot is screwed in the inner barrel, a slot extending in the circumferential direction is provided at a part protruding from the survey apparatus in the outer barrel; and a screw inserted into the corresponding slot is screwed in the intermediate barrel. Therefore, with the respective screws loosened, by adjusting the position of the inner barrel in the axial direction and the angle of the intermediate barrel around the axis, a shift between the laser beam emitted from the laser centering device and the direction of the perpendicular axis of a survey apparatus can be simply adjusted by a user himself at all times without disassembling the survey apparatus, that is, without requesting servicing personnel to adjust the same.

Since graduations are provided on the sides of the respective slots provided respectively in the intermediate barrel and the outer barrel, it is possible to look into the respective adjustment amounts of the inner barrel and intermediate barrel, and it becomes easier still to adjust the emission direction of the laser beam.

Since a rubber cover is attached to a part protruding from a survey apparatus of the laser centering device, the laser centering device can be protected from dust, water and impact, etc., and appearance thereof can be secured.

A method is provided for adjusting a laser beam emission direction in a survey apparatus to which a laser centering device as previously described is attached. The method is capable of adjusting the emission direction of a laser beam in a survey apparatus provided with a laser centering device, in which a mat having the same color as that of a laser beam emitted from the laser centering device, on which a concentric circle is depicted is placed directly below the perpendicular axis of the survey apparatus so as to cause the center of the mat to align with the perpendicular axis, wherein the emission direction of the laser beam is adjusted so that the laser beam is irradiated onto the center of the mat. Therefore, it is easy to look into the point of irradiation of the laser beam and to estimate the adjustment amount. Further, it becomes easier still to adjust the emission direction of the laser beam.

Since a mat for adjusting a laser centering device has the same color as that of a laser beam emitted from the laser centering device and has a concentric circle depicted thereon, it is easy to look into the point of irradiation of the laser beam if the emission direction of the laser beam is adjusted by using the mat, and further the adjustment amount can be easily estimated. In addition, it becomes easier still to adjust the emission direction of the laser beam.

DESCRIPTION OF THE REFERENCE NUMBERS

1 Survey apparatus
30 Laser centering device
32 Inner barrel
34 Intermediate barrel
36 Outer barrel
40 Pentagonal prism (Prism)
42 Laser diode (Laser beam)
64,70 Slots
66,72 Screws
76 Rubber cover
100 Mat (mat for adjustment of a laser centering device)

What is claimed is:

1. An improved laser centering device for use in a survey apparatus having a horizontal opening for receiving the device and a vertical opening aligned with a vertical machine axis of the apparatus, wherein the improvement comprises:
    a positional and angular adjustment mechanism adapted to adjust an angle of a laser beam emitted by the laser centering device relative to the vertical machine axis of the survey apparatus to align the laser beam with the vertical machine axis,
    wherein said centering device includes a barrel having a laser source provided therein, and said adjustment mechanism has an axial slot and a circumferential slot limiting movement of said barrel within a predetermined axial range and a predetermined angular range, respectively.

2. The improved laser centering device defined in claim 1 wherein said device includes an inner barrel having a prism fixed at one end thereof and a laser beam source provided therein; an intermediate barrel for fixing said inner barrel so that it is adjustably positionable in the axial direction; and an outer barrel for fixing said intermediate barrel so that its angle around the axis is adjustable.

3. The improved laser centering device as set forth in claim 2, wherein said prism is a pentagonal prism.

4. The improved laser centering apparatus as set forth in claim 2, wherein said axial slot extends in the axial direction at a part protruding from said outer barrel in said intermediate barrel; a screw inserted into said axial slot is screwed in said inner barrel, said circumferential slot extends in the circumferential direction and is provided at a part protruding from said survey apparatus in said outer barrel; and a screw inserted into the circumferential slot is screwed in said intermediate barrel.

5. The improved laser centering device as set forth in claim 4 wherein graduations are provided on the sides of said respective slots.

6. The improved laser centering device as set forth in claim 1 wherein a rubber cover is attached to a part protruding from a survey apparatus of said laser centering device.

7. A method for adjusting a laser beam emission direction in a survey apparatus to which a laser centering device is attached, said method comprising:
    providing the laser centering device including a positional and angular adjustment mechanism adapted to adjust an angle of a laser beam emitted by the laser centering device relative to a vertical machine axis of the survey apparatus to align the laser beam with the vertical machine axis;
    wherein said centering device includes a barrel having a laser source provided therein, and said adjustment mechanism has an axial slot and a circumferential slot limiting movement of said barrel within a predetermined axial range and a predetermined angular range, respectively;
    providing a mat having the same color as that of a laser beam emitted from said laser centering device, on which a concentric circle is depicted;
    placing said mat directly below said vertical machine axis of said survey apparatus so as to cause the center of said mat to align with the vertical machine axis, and
    adjusting the emission direction of the laser beam so that said laser beam is irradiated onto the center of said mat.

8. The improved laser centering device as set forth in claim 1 further comprising a mat having the same color as that of a laser beam emitted from the laser centering device and having a concentric circle depicted thereon.

9. The improved laser centering device as set forth in claim 1, wherein said centering device further includes fasteners that cooperate with said slots to affix said barrel at a selected axial and angular position.

10. An improved laser centering device for use in a survey apparatus having a horizontal opening for receiving the device and a vertical opening aligned with a vertical machine axis of the apparatus, wherein the improvement comprises;
    a positional and angular adjustment mechanism adapted to adjust an angle of a laser beam emitted by the laser centering device relative to the vertical machine axis of the survey apparatus to align the laser beam with the vertical machine axis,
    wherein said centering device includes a barrel having a laser source provided therein, and said adjustment mechanism has stops limiting movement of said barrel within a predetermined axial range and a predetermined angular range, and first and second fasteners for affixing said barrel at selected positions within said axial range and angular range, respectively, and
    wherein said device includes an inner barrel having a prism fixed at one end thereof and a laser beam source provided therein; an intermediate barrel circumscribing said inner barrel for fixing said inner barrel so that it is adjustably positionable in the axial direction, and an outer barrel circumscribing said intermediate barrel for fixing said intermediate barrel so that its angle around the axis is adjustable, such that said inner, intermediate, and outer barrels are concentrically disposed with respect to one another.

* * * * *